(12) United States Patent
Marchant et al.

(10) Patent No.: US 6,319,743 B1
(45) Date of Patent: Nov. 20, 2001

(54) METHOD OF MAKING THIN FILM PIEZORESISTIVE SENSOR

(75) Inventors: Robert B. Marchant, San Clemente, CA (US); Majid Fazeli, Plano, TX (US)

(73) Assignee: Mykrolis Corporation, Bedford, MA (US)

( * ) Notice: Subject to any disclaimer, the term of this patent is extended or adjusted under 35 U.S.C. 154(b) by 0 days.

(21) Appl. No.: 09/291,468

(22) Filed: Apr. 14, 1999

(51) Int. Cl.[7] .................................................. H01L 21/00
(52) U.S. Cl. ........................ 438/50; 438/53; 438/345; 438/446; 437/79; 437/901; 437/907; 437/908; 437/918
(58) Field of Search .................... 438/50, 53, 446, 438/345; 437/79, 901, 908, 907, 918

(56) References Cited

U.S. PATENT DOCUMENTS

| | | | |
|---|---|---|---|
| 3,912,563 | * 10/1975 | Tomioka et al. | 156/13 |
| 3,938,175 | 2/1976 | Jaffee et al. | 338/4 |
| 4,003,127 | 1/1977 | Jaffee et al. | 438/53 |
| 4,229,502 | 10/1980 | Wu et al. | 438/446 |
| 4,267,011 | 5/1981 | Shibata et al. | 438/585 |
| 4,407,060 | 10/1983 | Sakurai | 438/345 |
| 4,514,895 | 5/1985 | Nishimura | 438/166 |
| 4,575,925 | 3/1986 | Kanbara et al. | 438/413 |
| 4,579,600 | 4/1986 | Shah et al. | 438/386 |
| 4,657,775 | 4/1987 | Shiori et al. | 427/578 |
| 4,727,044 | 2/1988 | Yamazaki | 438/166 |
| 4,803,528 | 2/1989 | Pankove | 257/410 |
| 5,095,401 | 3/1992 | Zavracky et al. | 361/283.4 |
| 5,242,863 | 9/1993 | Xiang-Zheng et al. | 438/53 |
| 5,518,951 | 5/1996 | Paynter et al. | 438/50 |
| 6,011,666 | * 12/1999 | Diem et al. | 438/52 |

OTHER PUBLICATIONS

H. Matsumura et al., "A Heat–Resisting New Amorphous Silicon," Appl. Phys. Lett. 36(6):439–440; Mar. 15, 1980.
B.Y. Tong et al., "Highly Stable, Photosensitive Evaporated Amorphos Silicon Films," Appl. Phys. Lett. vol. 38 (10): 789–790; May 15, 1981.
J. Binder et al., "Laser–Recrystallized Polysilicon Resistors for Sensing and Integrated Circuits Applications," Sensors and Acuators, 4; 1983.
E. Luder, "Polycrystalline Silicon–Based Sensors," Sensors and Actuators, 10: 1986.

* cited by examiner

Primary Examiner—Michael Lebentritt
Assistant Examiner—Pho M. Luu
(74) Attorney, Agent, or Firm—Timothy J. King

(57) ABSTRACT

Semiconductor piezoresistive sensors are formed by a process using selective laser activation of a doped semiconductor surface. The substrate is a flexible membrane such as a diaphragm or bellows. A layer of insulative dielectric material is first applied to the substrate. A layer of highly resistive doped semiconductor material is then deposited on top of the dielectric layer. Through the use of an alignment device one or more piezoresistive sensors are formed by use of laser annealing of selected areas of the semiconductor material such that the annealed areas have a resistance suitable for use as sensors. Metal contacts are then applied over the end portions of sensors and form an electrical connection to the sensors. The non-annealed portions of doped semiconductor layer act as insulators between the formed piezoresistive sensors.

13 Claims, 3 Drawing Sheets

METHOD OF MAKING THIN FILM PIEZORESISTIVE SENSOR

This invention relates to semiconductor piezoresistive gauges and in particular piezoresistive sensors fabricated by a method wherein selected portions of a thin film of doped semiconductor material deposited on an insulated flexible substrate are activated by a laser annealing process.

BACKGROUND OF THE INVENTION

It is well known in the art that semiconductor material such as doped silicon possess piezoresistive characteristics. This simply means that the electrical resistance of the semiconductor material changes when the material is subjected to strains such as bending. The change in resistance, and hence the strain applied to the semiconductor material can be measured accurately. This material and its capabilities can be used as a piezoresistive sensor.

One method for making such a device is to simply take a piece of doped silicon and bond it to a strain receiving member by an adhesive. The strain-receiving member is typically a flexible metal sheet, bellows or diaphragm. The opposed side of strain receiving member is exposed to the media that is being measured. Bending of the membrane induces strain; hence resistance change, on the gauges. The major drawback to this glued sensor technology is its susceptibility to output drift. As the sensor ages the bond between the semiconductor material and strain-receiving member also changes.

U.S. Pat. No. 5,518,951 describes a sensor formed by applying two or more insulative silicon layers directly to a strain-receiving member such as a metal sheet, bellows or diaphragm. A layer of doped silicon is applied to the insulative layers. Metal contacts for connection between the resistive measuring device and the yet to be formed piezoresistive sensors are then formed at selected predetermined locations. The nonconductive doped layer is then selectively activated in specific locations between the metal contacts to form the resistive sensors. A laser of suitable wavelength is used to activate the doping agent in the layer into activation and conductivity. This causes the layer between the metal contacts to heat, anneal and recrystalize thereby causing the doping atoms into conductivity and form the piezoresistive sensors between the metal contacts.

The sensor fabrication technique of the '951 patent leaves much room for improvement. As the resistor is formed after placement of metal contacts, it can only be formed between the adjacent edges of the pads. As the activation only occurs where the laser can reach, the area of contact between the resistor and the metal pads is often no more than a thin contact line formed between the edge of pads and the resistor. Even placing the laser at an angle smaller than 90° to the surface of the doped layer has failed to provide any incremental area of contact between the pad and the resistor. Any thermal distortion can disrupt this thin connection causing the resistor to fail.

Accordingly, there is a need for a more robust design capable of withstanding thermal distortion and which can be formed in a method for high volume fabrication.

SUMMARY OF THE INVENTION

The difficulties and problems of prior art methods for fabricating piezoresistive sensors are addressed by the method of present invention to form thin film semiconductor piezoresistive sensors. A strain-receiving member in the form of a substrate of chosen material functions as a diaphragm that flexes in response to changes in the media to be measured. The flexion is typically cause by changes in pressure or temperature of the media. In a preferred embodiment of present invention, the substrate is a flexible diaphragm, the displacement of which is measured through a piezoresistive sensor on the diaphragm to provide an indication of pressure change, force change, temperature change, weight change, etc.

Using a deposition process, the nonconductive semiconductor layers are deposited on a cleaned surface of the diaphragm. Use of deposition technology accurately and consistently controls the desired thickness of all deposited layers thereby allowing for mass production of sensors exhibiting consistent design tolerances. First a thin dielectric insulated layer; either of silicon nitride or silicon oxide is deposited on the diaphragm surface. A layer of doped amorphous/polycrystalline silicon, to form the piezoresistive sensors, is vapor deposited over the dielectric layer. As deposited, the layer is highly resistive and has low piezoresistive qualities.

The nonconductive doped silicon layer is then activated in one or more selected locations to form the one or more piezoresistive sensors. A laser is used to activate the doping atoms present in the layer. The metal contacts for connection between the piezoresistive sensors are then placed at selected locations on the doped film over the piezoresistive sensors using either a sputtering or evaporation method. A shadow mask pattern for the contact location is placed over the doped layer to allow the metal to be deposited at the proper contact location. The mask is aligned with the piezoresistive sensors via the use of an alignment feature formed on the substrate. The alignment feature may be a mechanical device such as a notch, lug or mark relative to which the sensors and metal pads are formed. This ensures accurate and consistent location of the various layers and components on the substrate.

Optionally, a passivation layer may also be applied. This passivation layer also seals out any impurities that may corrupt the sensor and affect performance.

IN THE DRAWINGS

DETAILED DESCRIPTION OF THE INVENTION

For ease of description, the method of manufacturing thin film piezoresistive sensors of the present invention will be described in connection with the preparation of only one such sensor. It will however be understood that the method of present invention may be advantageously used to simultaneously manufacture many sensors through the use of well-known semiconductor wafer manufacturing technology in conjunction with the method of present invention. Further, although the preferred embodiment of present invention discloses sensor fabrication with silicon based materials, it is understood at the sensor may be formed of other semiconductor type materials, including for example, germanium, which exhibit similar properties.

Figure 4:
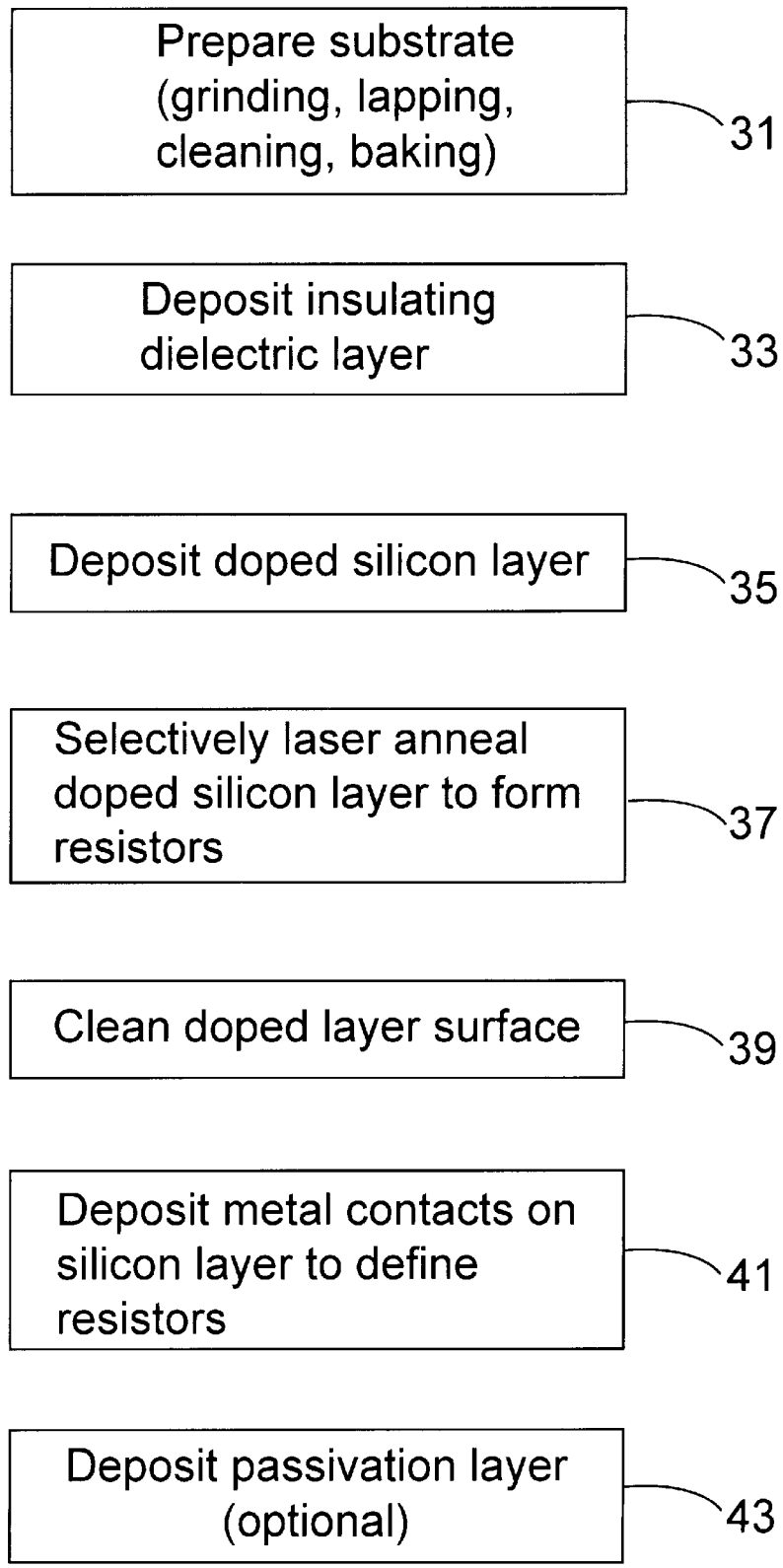
FIG. 4 shows a flow diagram for the process of fabrication of the sensor as shown by FIGS. 1A–1F.

Reference is now made to FIGS. 1A to 1F and FIG. 4 for an explanation of the manufacturing method utilized to fabricated the thin film piezoresistive sensors. In FIGS. 1A to 1F, there is shown, in a series of schematic cross-sectional views, a thin film piezoresistive sensor at different manufacturing steps of process of present invention. FIG. 4 shows the flow diagram corresponding to the manufacturing steps of FIGS. 1A–1F.

A strain-receiving member in the form of substrate 1 of a chosen material provides the support for the sensor of present invention. The substrate 1 as shown in FIG. 1A is preferably formed of a flexible metal substance such as stainless steel, nickel, Hastalloy, Inconel, chromium or titanium, although it may be formed from any other chosen material, for example a ceramic, provided that the material flexes in response to changes in force pressure and hot temperature and is compatible with the media the sensor is designed to measure.

Figure 2:
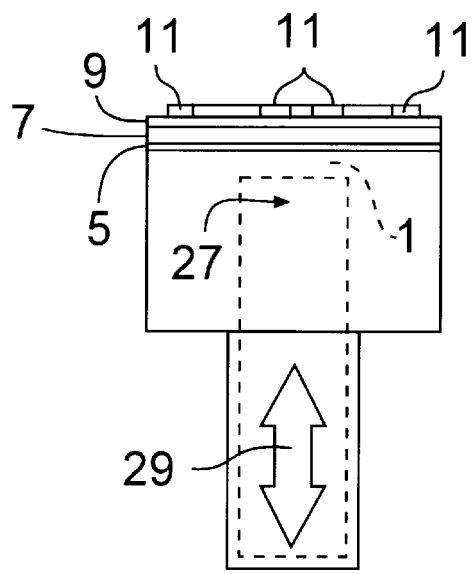
FIG. 2 shows a side view of the pressure sensing application of the thin film sensor made by the present invention.

For example, in a pressure sensor application as shown in FIG. 2, the metal substrate 1 covers an aperture 27 to provide a pressure diaphragm flexing in response to pressure changes in the fluid flow 29. It should be understood that a sensor fabricated by the process of present invention also finds utility in many other force measurement applications, such as torque sensors, load cells and accelerometers.

Figure 1A:
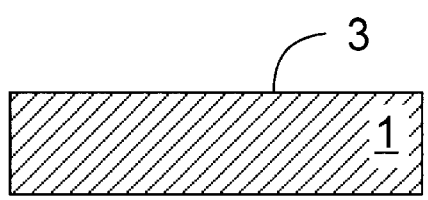
FIGS. 1A to 1F show the partial schematic cross-sectional views of a thin film sensor during the different steps of the process in accordance with the present invention.

The first step of present invention as shown at FIG. 1A and FIG. 4 at flow step 31, the top surface 3 of the substrate 1 is prepared for application of subsequent layers. The top surface 3 of the substrate 1 is first ground to an appropriate thickness and then lapped to a smooth finish to promote bonding of insulative layer. After lapping, the substrate 1 is cleaned by washing off the lapping compounds and fluids from its surfaces. Next the lapped surface is passivated in a wet process and is cleaned again. Finally, the substrate 1 is baked in a dehydration chamber to remove any water or moisture remaining from the lapping or cleaning process.

Figure 1B:
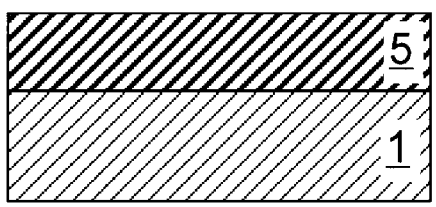

The second step as shown in FIG. 1B and FIG. 4 at flow step 33 a nonconductive, insulative layer 5 is deposited on the top surface 3 of substrate 1. The layer 5 may be formed of silicon nitride ($Si_3N_4$), silicon dioxide ($SiO_2$), combinations of the two or any other insulating dielectric layer having similar qualities. Silicon dioxide is preferred for this layer due to its superior adhesion properties.

The preferred method of deposition of layer is by plasma enhanced chemical vapor deposition (PECVD). Although a sputtered or thermally grown oxide can also be used this deposition process takes advantage of thermal decomposition due to plasma enhancement to deposit thin films of semiconductor material in a controlled manner. The operation of a PECVD process is well known in the art, as described in U.S. Pat. No. 5,518,951, the teachings of which are incorporated herein in their entireties.

The parameters of deposition method can be varied according to the desired properties, uses and configuration of device. For purposes of illustration only and not as a limitation, the parameters of the deposition process used in each step of this method will be provided as a specific example of the practice. Furthermore, it is understood that any other process compatible with the diaphragm material and suitable for depositing semiconductor material may be substitute for the process utilized in the preferred embodiment.

To deposit the insulative layer 5 using the preferred process and the preferred material, namely silicon dioxide, silane ($SiH_4$) and nitrous oxide 1–2% are introduced into the chamber. The chamber is set at a temperature as low as 250° C., preferably about 300° C. and a pressure as high as 1000 millitorr, preferably about 360 millitorr. Applied plasma energy at 50 watts with a frequency of 13.5 megahertz for a time of approximately 50 minutes results in an oxide film of 3.5 to 5 microns thick.

Optionally, one may apply more than one insulative layer to the device although these are not necessary. These additional layers may be formed of same material as the first insulative layer or they may be formed of different material which is compatible with and bonds to both the insulative layer 5 and the additional layers above the insulative layer 5.

Figure 1C:
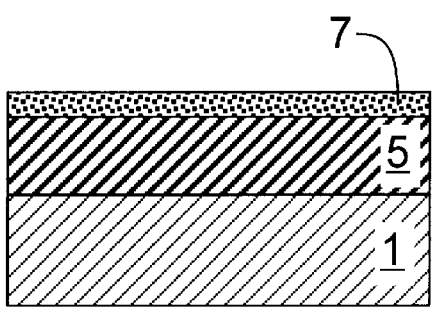

Following the formation of insulative layer 5, as shown in FIG. 1C and FIG. 4 at step 35, a doped amorphous/polycrystalline silicon layer 7 is vapor deposited over the insulative layer 5. Portions of the polycrystalline silicon layer 7 will eventually be formed into a piezoresistive sensor gauge according to a process step yet to be described. As deposited however, the amorphous/polycrystalline silicon layer 7 is highly resistive, exhibiting poor piezoresistive qualities and is similar to the deposited dielectric insulative layer 5. In the preferred embodiments of invention, the amorphous/polycrystalline layer 7 is doped with boron. It will be understood however that the layer 7 may be doped with other materials or may be comprised of any other doped semiconductor material.

The doped layer 7 is vapor deposited with a PECVD apparatus similar to that used to deposit the insulative layer 5. To deposit a boron-doped material having a designed thickness of 0.5 microns utilizing the PECVD system, doped silane is introduced into the chamber at a flow rate of 45 SCCM. The chamber is set at a temperature of about 300° C. and a pressure of from about 300 to 1000 millitorr. Applied plasma energy at 30 watts with a frequency of 13.5 megahertz for a length of time to deposit the desired film thickness.

Figure 1D:
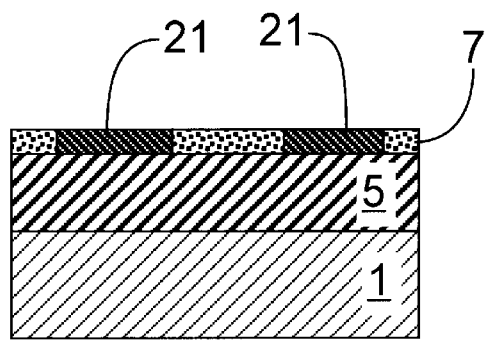

Next, as shown in FIG. 1D and FIG. 4 at step 37, one or more piezoresistive sensors are formed in the doped layer 7 according to the method of the present invention. To create these one or more piezoresistive sensors, the doped layer needs to be selectively activated and made conductive and piezoresistive through an annealing process. To anneal and form the piezoresistive sensors in the doped layer 7, it is preferred to use a laser beam, for example a YAG laser or an Argon laser, to trace the one or more individual piezoresistive sensors 21 at specific locations in the doped layer 7. The laser is directed to pass over the layer 7 in the predetermined and preselected region or regions of the layer 7 to heat the polycrystalline layer 7. The heat generated by the laser anneals the area directly beneath the laser while leaving the remainder of polycrystalline layer 7, which has not been touched by the laser, unaffected such that the remainder of the layer act as an insulator between any adjacent piezoresistive sensors.

The operating conditions, such as power and time, applied to the layer 7 by the laser must be selected such that the laser energy will be absorbed by and anneal the amorphous/polycrystalline layer. The overall length of the lased strips in the doped layer 7 may be as desired, provided that it is of a length greater than that of the finished length of the sensor defined as the length between the two pads (yet to be formed). Preferably the overall length of the lased strips in the doped layer is at least 1.25 the finished length of the sensor. By doing so, one ensures that the sensors extend for some distance under the metal pads making for a complete and nondisruptable contact.

Figure 3:
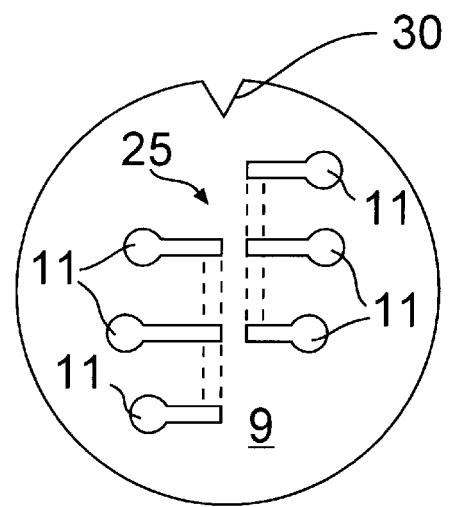
FIG. 3 shows a schematic top view of a Wheatstone Bridge circuit as defined by the present invention.

In order to assist in the proper location of the piezoresistive sensors in the doped layer 7, it is desirable to form an alignment device for registering and retaining the surface of diaphragm in a fixed location. By doing so, one is always able to register the formation of the various layers, in particular the piezoresistive sensors and the metal pads such that they are in direct conductive communication with each other. One device for accomplishing this is to form a notch 30 in the edge of surface of the diaphragm as shown in FIG. 3. This notch 30 can be designed to fit with a corresponding abutment in a holder (not shown) so as to maintain the diaphragm in a fixed position during the formation of thin film sensor device of this invention. Alternatively, other devices such as lugs, alignment marks, two or more notches or other such devices may be used to ensure proper alignment and registration of the layers on the surface of the diaphragm.

After formation of the sensor, the surface of the doped layer 7 should be cleaned in order to ensure that there is an adequate bond between the doped layer 7 and the metal pads 11. This is shown in FIG. 4 at step 39. Several different methods may be used i.e. plasma cleaning, RF cleaning or wet chemical etching.

Figure 1E:
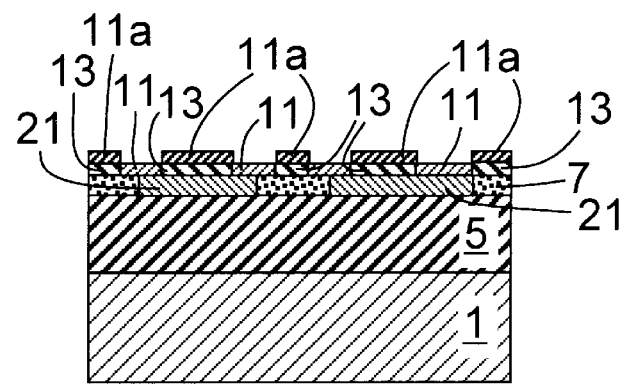

As shown in FIG. 1E and FIG. 4 at step 41, the metal contact pads 11 are deposited over the doped layer 7 at the preselected locations which corresponding to the respective ends of one or more sensors 21. A shadow mask pattern 13 for the contact pad 11 locations is placed over the doped layer 7 and aligned or registered with the alignment device 30 to allow for proper placement and formation of contact pads 11. Unwanted metal 11a is prevented from being deposited on the surface of doped layer 7 by the shadow mask pattern 13. Preferably, an adhesion layer is first deposited,ie. NiCr or Ti followed by the contact pad (s) 11. The pads are preferably formed of an aluminum/1% silicon mixture or gold and are deposited to a thickness of about 1.0 micron. The mask 13 and unwanted metal 11a is then removed leaving the metal pads 11 on the surface of the doped layer 7.

Figure 1F:
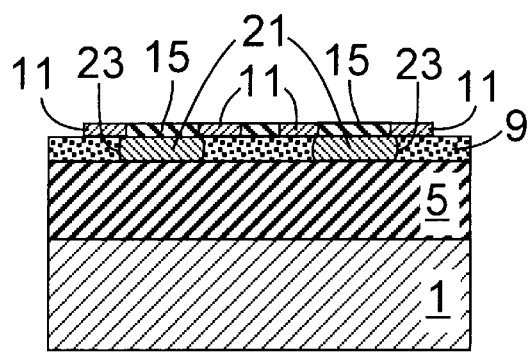

Following the above steps, as shown in FIG. 1F and FIG. 4 at step 43, a passivation layer 15 may either be vapor deposited or manually applied over the doped and laser annealed layer 7. The passivation layer 15 seals out impurities and contaminant from the silicon surface and protects the device from environmental effects.

Referring to FIG. 3, a Wheatstone Bridge circuit 25 having 4 resistors is shown in broken lines defined in the amorphous/polycrystalline layer 7. Each resistor in the circuit 25 acts as a piezoresistive sensor element. Metal contacts 11 enable electronic resistive measuring equipment to be coupled to the circuit 25. The parts of doped layer 7 that were untouched by the laser remain essentially highly resistive and that in conjunction with the insulative layer below act as insulators between the resistors and the diaphragm and between individual adjacent resistors. Thus, expensive photolithography steps are not required to form or remove areas of layer as was required in the prior art. Even though a Wheatstone Bridge sensor circuit is disclosed, it is understood that the method of present invention may be used to form any type of piezoresistive sensor element or circuit design in the doped layer 7.

Although a preferred embodiment of present method and apparatus of present invention has been illustrated in the drawings and detailed description above, it is understood that the invention is not limited to the disclosed embodiment but is capable of numerous modifications without departing from the scope of the invention.

What we claim:

1. A method of forming a piezoresistive semiconductor sensor gauge comprising the steps of:

preparing at least a first surface of a substrate having two opposed surfaces;

depositing a dielectric insulative layer on the first surface of the substrate;

depositing a doped semiconductor layer on top of the dielectric insulated layer, said semiconductor layer having a high resistivity as deposited;

annealing the doped semiconductor layer in one or more selected regions to lower resistivity of the semiconductor layer in the one or more selected regions and define therein one or more sensor gauges comprised of the annealed semiconductor material;

removing surface oxidation and/or contaminants caused by the annealing step; and applying electrical contacts adjacent to annealed semiconductor material, said contacts overlying at least a portion of said annealed semiconductor material.

2. The method of claim 1 wherein the substrate has an alignment feature formed in at least one of its surfaces.

3. The method of claim 1 wherein the substrate has an alignment feature formed in at least one of its surfaces and said alignment feature is a mechanical device formed from the group consisting of notches, lugs and marks.

4. The method of claim 1 wherein the step of preparing the substrate comprises the steps of grinding, lapping, washing and drying at least the first surface.

5. The method of claim 1 wherein the step of depositing a dielectric insulated layer comprises the step of vapor depositing through a plasma enhanced chemical vapor deposition process an insulative layer formed of a material selected from the group consisting of silicon nitride, silicon dioxide and blends thereof.

6. The method of claim 1 further comprising a step of applying a passivation layer onto the electrical contacts and doped layer after formation of the electrical contacts.

7. The method of claim 1 wherein the step of a doped semiconductor layer on top of dielectric insulated layer comprises the step of vapor depositing through a plasma enhanced chemical vapor deposition process a layer of amorphous/polycrystalline silicon material which has been doped.

8. The method of claim 1 wherein the vapor depositing is by a plasma enhanced chemical vapor deposition process.

9. The method of one wherein the step of annealing portions of the semiconductor layer comprises the step of irradiating one or more selected portions of the layer with a laser beam to anneal the doped semiconductor layer into high conductivity so as to form the sensors.

10. A piezoresistive sensor comprising a flexible substrate, said substrate covering an aperture, said aperture being in fluid communication with a media, said flexible substrate being capable of flexing in response to a change in the media, the substrate having an alignment device, said substrate having a first and second surface, the first surface having an insulative dielectric layer formed upon it, said dielectric layer having a highly resistive doped semiconductor material layer integrally bonded to the upper surface of the dielectric layer, said semiconductor material layer having one or more portions which are annealed so as to form conductive piezoresistive sensors, said sensors having a first and a second end, a metal contact bonded to the surface of the semiconductor material layer so as to overlay the first and second ends of sensors respectively and an electrical connector between the metal contacts and an electrical resistive measuring device.

11. The sensor of claim 10 wherein the sensor is used to monitor a pressure differential and wherein said media is selected from the group consisting of gas and liquids.

12. The sensor of claim 10 wherein the dielectric layer and the semiconductor material layer are formed by a vapor deposition process.

13. The sensor of claim 10 further comprising a passivation layer applied over the semiconductor material layer and the metal contacts.

* * * * *